United States Patent
Gabrys

(10) Patent No.: US 6,639,370 B1
(45) Date of Patent: Oct. 28, 2003

(54) SPEED CONTROL FOR A FLYWHEEL ENERGY STORAGE SYSTEM

(75) Inventor: Christopher W. Gabrys, Reno, NV (US)

(73) Assignee: Indigo Energy, Inc., Napa, CA (US)

( * ) Notice: Subject to any disclaimer, the term of this patent is extended or adjusted under 35 U.S.C. 154(b) by 54 days.

(21) Appl. No.: 10/026,745

(22) Filed: Dec. 20, 2001

Related U.S. Application Data

(60) Provisional application No. 60/257,937, filed on Dec. 20, 2000.

(51) Int. Cl.[7] .................................................. H02K 7/02
(52) U.S. Cl. ...................... 318/161; 318/254; 318/439; 318/138; 318/434
(58) Field of Search ................................. 318/161, 254, 318/439, 138, 802, 434, 471, 798, 800, 801

(56) References Cited

U.S. PATENT DOCUMENTS

| | | | | |
|---|---|---|---|---|
| 3,609,487 A | * | 9/1971 | Allison ........................ | 318/138 |
| 4,617,507 A | | 10/1986 | Eisenhaure et al. | |
| 5,859,510 A | * | 1/1999 | Dolan et al. ................ | 318/254 |
| 5,955,816 A | | 9/1999 | Clifton et al. | |
| 6,262,505 B1 | | 7/2001 | Hockney et al. | |
| 6,307,336 B1 | * | 10/2001 | Goff et al. .................. | 318/254 |

OTHER PUBLICATIONS

"Powering of Standby Power Supplies Using Flywheel Energy Storage" Hockney and Driscoll.

* cited by examiner

*Primary Examiner*—Karen Masih
(74) *Attorney, Agent, or Firm*—J. Michael Neary

(57) ABSTRACT

Accordingly, the invention provides a speed control for a flywheel energy storage system that provides accurate and reliable speed control for long-term operation. The speed control uses a current limiting means that safely limits the acceleration current to the motor for accelerating flywheel, and a rate controller that digitally switches the acceleration current on and off to maintain the desired steady state speed. The rate controller turns the acceleration current off when the flywheel speed is above the desired steady state speed and then turns the acceleration current back on when the flywheel speed falls below the desired steady state speeds. The digital type speed control can be made both more accurate and reliable by using straightforward on/off control about the desired steady state operating speed. The rate controller can operate by measuring the frequency of excitation of a rotational position sensor, and turning the acceleration on or off based on whether the frequency of excitation exceeds a threshold value corresponding to the desired steady state speed. The rate controller could instead operate by measuring the average voltage across one or more electromagnetic coils that are magnetically excited by the rotation of the flywheel and turning the acceleration on or off based on whether the average voltage exceeds a threshold value corresponding to the desired steady state speed.

14 Claims, 11 Drawing Sheets

SPEED CONTROL FOR A FLYWHEEL ENERGY STORAGE SYSTEM

This relates to U.S. Provisional Application No. 60/257,937 entitled "Speed Control Method for a Flywheel Uninterruptible Power Supply" filed on Dec. 20, 2000.

This invention pertains to flywheel energy storage systems and more particularly to a speed control method that provides for rapid charging, safe, reliable and accurate speed control and has a low cost construction.

BACKGROUND OF THE INVENTION

Flywheels have been used for many years as energy storage devices. They have often been used as power smoothing mechanisms for internal combustion engines and other kinds of power equipment. More recently, flywheels have been recognized as a very attractive energy storage technology for such electrical applications as uninterruptible power supplies, utility load leveling systems, electric vehicles and for storage with alternative energy generation.

Modern flywheel energy storage systems convert back and forth between a spinning flywheel's rotational energy and electrical energy. A flywheel energy storage system includes a flywheel; a motor generator, a bearing system and a vacuum enclosure. The rotating flywheel stores mechanical energy, the motor generator converts electrical energy to mechanical energy and visa-versa, and the bearing system physically supports the rotating flywheel.

To compete with lower cost electrochemical batteries, the flywheel systems must maximize their possible energy storage. To do this, the flywheel speed is preferably maintained at about the full charge speed and the full charge speed must be set as high as safely allowable by the flywheel structural capability. This maximizes the flywheel operating stress and hence the energy storage capability. When operating at high stress levels, accurate and reliable speed control is essential for safety, and for this reason speed control is a critical issue.

Flywheel systems typically employ brushless type synchronous motor/generators for long life and hence electronics are required to provide the commutation. One way possible to drive the motor/generator of a flywheel system is to use a servo amplifier or pulse modulated bi-directional inverter. The servo amplifier converts power to synchronous AC to drive the motor/generator coils and a separate reference input voltage is used to control the duty cycle of the pulses supplying power through pulse modulation. In some cases, the fluctuations in line voltage that powers the motor can cause the flywheel to have less than a full charge or likewise cause the flywheel to accelerate to higher than safe speeds. This type of problem is possible when the flywheel motor/generator is driven using a servo amplifier operating in simple duty cycle (open loop) mode. Derating the flywheel to account for input charging voltage deviations results in less than full energy storage for the flywheel system, an undesirable result. In telecommunications backup applications, the flywheel specification restricts speed deviations to no more than 2% above the rated speed.

To circumvent this problem, the flywheel speed can be kept at maximum speed regardless of fluctuations in the charging input voltage by operating a servo amplifier in an alternative mode such as a velocity mode. Velocity modes works using a velocity Proportional voltage signal as feedback that adjusts the duty cycle. The signal can come from either a tachometer or from a frequency-to-Voltage conversion circuit with position sensor input. The speed control can be conducted inside the servo amplifier itself or with the use of circuits. Unfortunately, these methods are not desirable or reliable for very long term operation due to several deficiencies. In operation, a summing amplifier generates an error signal that is proportional to the difference between the desired speed and the actual speed. This analog error signal is then used to set the duty cycle of the servo amplifier duty cycle. When the flywheel is accelerated, the output duty cycle may be initially limited by the current control loop in the amplifier at low speeds. The flywheel will initially accelerate at maximum current as desired. However, near the maximum speed the error signal on the speed control becomes smaller and smaller thus reducing the duty cycle and acceleration when close to full speed. The flywheel system can suffer by taking an exceedingly long time to fully charge. Other problems also arise related to the analog nature of the feedback loop. The setting of the operating speed requires a manual adjustment to set the exact required amplifier gain. This is both subject to error and can be difficult to test in flywheel systems that take hours to fully charge. These analog circuits are also subject to changing performance over time due to amplifier and component drift and degradation as well as with changes in temperature. Regardless of whether a flywheel motor/generator is driven by a servo amplifier or by another means, an accurate and reliable speed control method is needed, which should also preferably be low in cost.

SUMMARY OF THE INVENTION

Accordingly, the invention provides a speed control for a flywheel energy storage system that provides accurate and reliable speed control for long-term operation. The speed control uses a current limiter to safely limit the acceleration current to the motor for accelerating the flywheel, and a rate controller that digitally switches the acceleration current on and off to maintain the desired steady state speed. The rate controller turns the acceleration current off when the flywheel speed reaches a predetermined steady state speed and then turns the acceleration current back on when the flywheel speed falls below the desired steady state speed. Use of such an simple and economical speed control for controlling the speed of brushless motors is unconventional and against the well established principles in the art of motor control. Using an on/off speed control in conventional applications would result in very wide oscillations in speed with considerable overshoots and undershoots. The undesirable oscillations would also fatigue any attached rotating structures over long-term operation.

However, flywheel energy storage systems are unique applications for brushless motors and this speed control method of the invention is well suited to use in flywheel systems, in part because the flywheel unusually has a large rotational inertia comparatively to the power level of its motor/generator. Flywheel systems also typically operate at high speeds, and because the power level is proportional to the torque multiplied by the rotational speed, torque levels can also be reduced at high operating speeds. Both of these attributes can cause the flywheel speed to, only be able to change relatively slowly when full torque is applied. The effect is that the large inertia of the flywheel sufficiently damps out any wide oscillations that would occur in the flywheel speed caused by the digital type control.

The digital type speed control can be made both more accurate and reliable by using straightforward on/off control about the desired steady state operating speed. The speed control is easy to implement, low in cost and is not subject to change over long-term operation. The speed control also charges the flywheel system as rapidly as possible by accelerating the flywheel with the maximum charging current of the rotor up until full operating speed is reached. Application of the speed control method to both (low power to energy storage) flywheel systems and (high power to energy storage) flywheel systems provides satisfactorily tight control. Calculations based on using a very slow on/off switching rate of only 1 Hz, low power and high power flywheel systems show speed oscillations of less than 0.01% and 0.7%, respectively. Considering that stress in a flywheel is proportional to the square of its speed, these speed oscillations in both cases cause stress oscillations that are less than 1.4%, rendering any fatigue effects on the flywheel completely insignificant. Use of a faster switching rate reduces oscillation amplitude even further.

In one embodiment, the rate controller operates by measuring the frequency of excitation of a rotational position sensor and turns the acceleration on or off based on whether the frequency of excitation exceeds a threshold value corresponding to the desired steady state speed, or is above or below a predetermined range of such values.

In another embodiment, the rate controller operates by measuring the average voltage across one or more electromagnetic coils that are magnetically excited by the rotation of the flywheel and turns the acceleration on or off based on whether the average voltage exceeds a threshold value corresponding to the desired steady state speed, or is above or below a predetermined range of such values. In a further embodiment, this method is used and the electromagnetic coils are phases of the armature coils of the motor/generator. This method can be used to control steady state operating speed in very low cost flywheel systems or alternatively can be used as a safety over-speed prevention method whereby the elevated average voltage, disconnects the charging power.

DESCRIPTION OF THE PREFERRED EMBODIMENT

Figure 1:
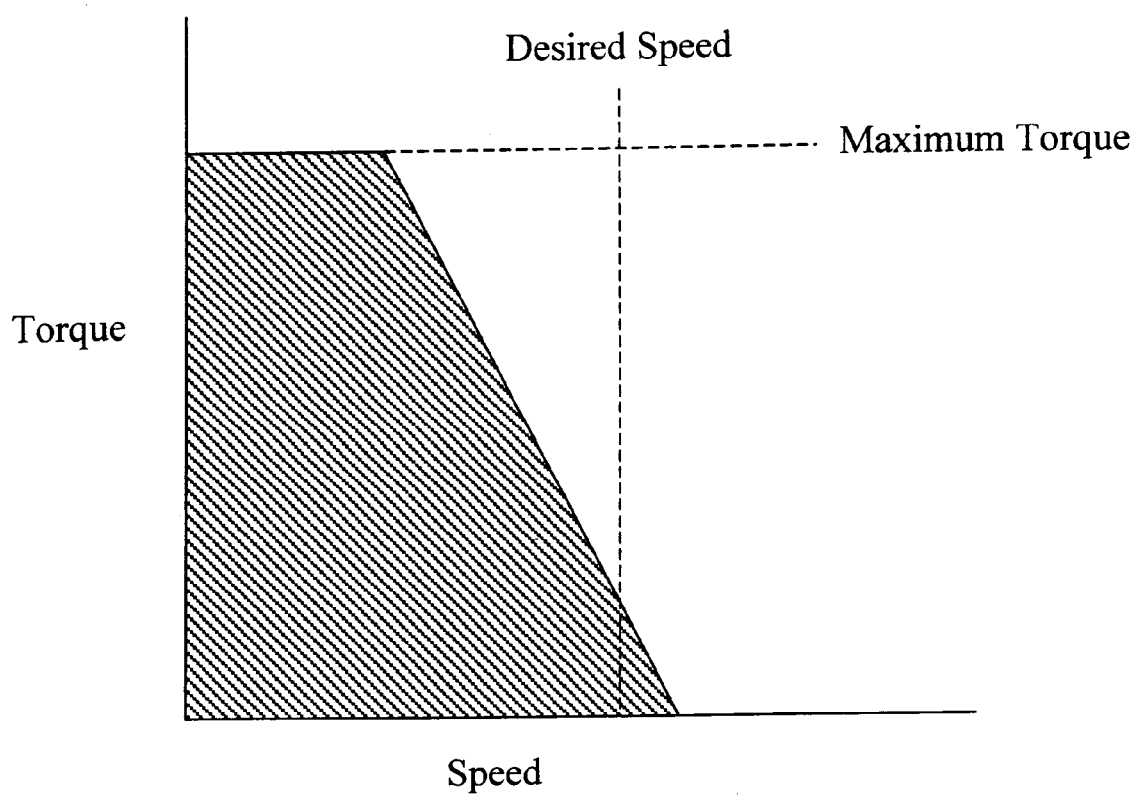
FIG. 1 is a graph showing torque vs. speed in a speed control for a brushless motor/generator of prior art.

Turning now to the drawings; wherein like reference numerals designate identical or corresponding parts, and more particularly to FIG. 1 thereof, a graph of motor torque vs. speed of a conventional brushless motor speed control is shown wherein the motor is initially accelerated at its maximum torque. As the speed increases, the speed control reduces the torque, prior to reaching the desired speed. The reduction in torque prior to attaining the desired operating speed is not an issue because in most motor applications, this speed is reached in a matter of seconds. In this case, the torque reduction is linear, as if an analog velocity loop were applied. The speed control effectively controls the motor speed at the desired operating speed and is adjusted such that some level of torque is being applied at the desired operating speed to counterbalance any drag torque, losses and load. This speed control is not optimal for use with a flywheel system however. The reduction in torque prior to reaching the desired operating speed would cause a flywheel system to take a very long time to fully charge due to the large inertia of the flywheel. The speed control also suffers from an initial adjustment requirement and potential long-term drift, both making it unreliable. Changes in the characteristics of the flywheel system and motor/generator over time can also affect the operating speed. Considering that the flywheel systems in most cases are expected to operate continuously for many years and that the safety of a flywheel system is significantly impacted by its operating speed, this speed control Is not desirable.

Figure 2:
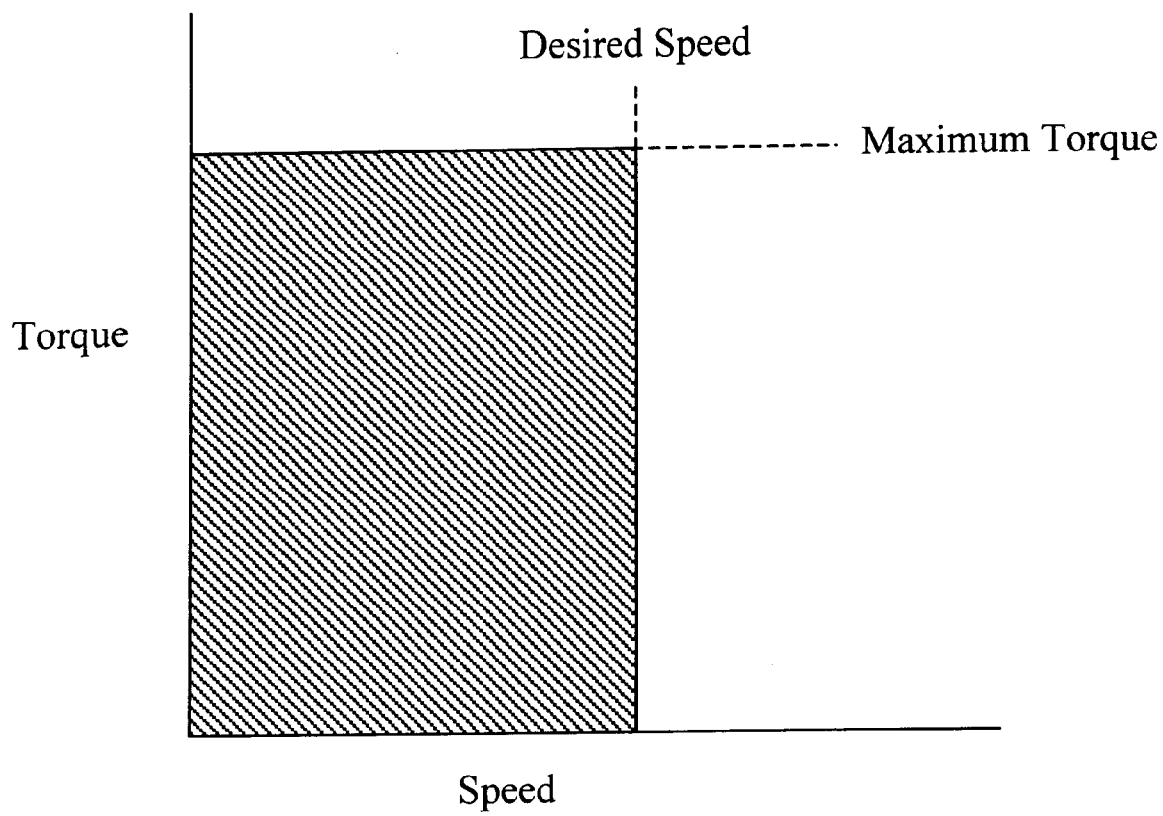
FIG. 2 is a graph showing torque vs. speed in a speed control for a flywheel energy storage system in accordance with the invention.

A graph of torque v. speed for a flywheel energy storage system using a speed control in accordance with the invention, as shown in FIG. 2, illustrates that the flywheel is accelerated with maximum torque until the desired steady state operating speed is reached. The maximum torque could alternatively vary somewhat with speed but it is usually constant. The maximum current for which the motor windings are rated usually limits maximum torque. When the flywheel speed reaches the desired operating speed, the torque is digitally turned off or alternatively switched to a reduced level that is insufficient to maintain the flywheel speed. As the flywheel speed slows below the desired operating speed from drag and losses, or a lower set speed at the lower end of a range, full torque is digitally switched on again. The cycle continues and the flywheel speed is maintained substantially at the desired operating speed or within the desired operating speed range. The use of the digital type set point or upper and lower set points for the operating speed or speed range makes the speed control more accurate and reliable. The method is also straightforward to implement and is low in cost.

Figure 3:
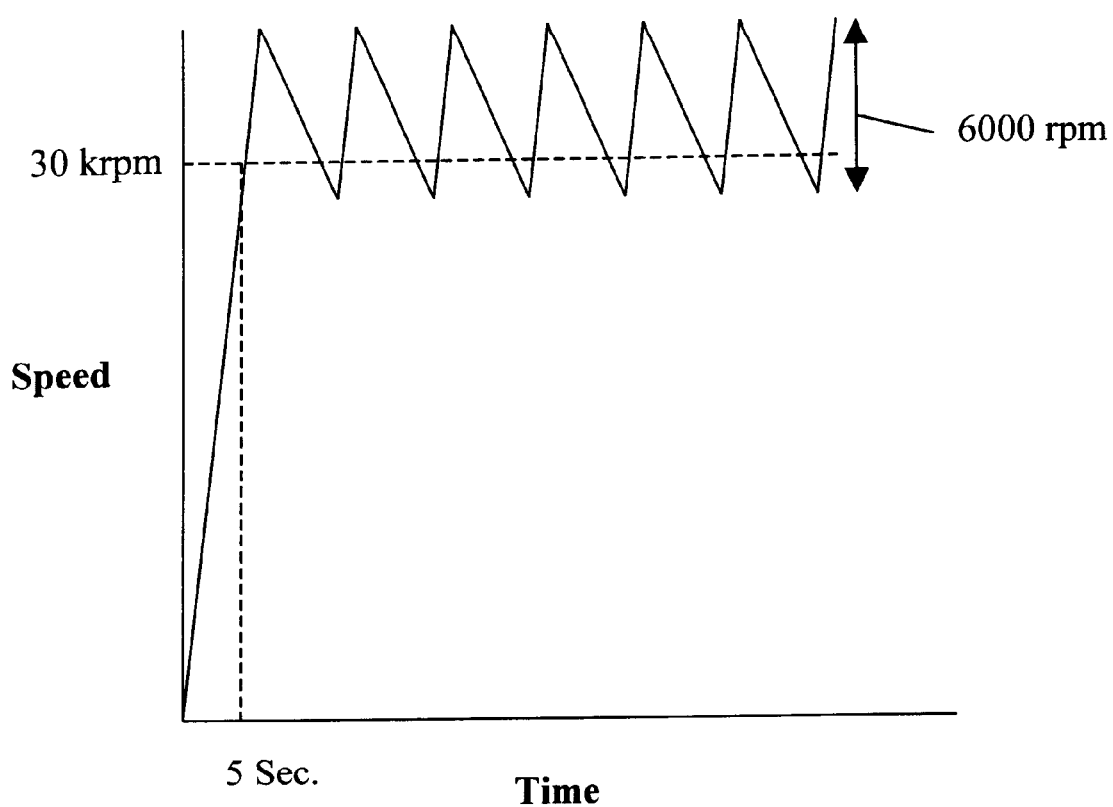
FIG. 3 is a graph showing speed vs. time in a speed control in accordance with the invention functioning in a non-flywheel brushless motor/generator application.

This speed control is not typically applied for control of brushless motors. Use of this speed control for a non-flywheel energy storage application is shown in FIG. 3. The speed control of FIG. 2 is applied to a conventional motor application with a desired operating speed of 30 krpm. The on/off acceleration switching rate was chosen to be 1 Hz. As is illustrated, the motor accelerates to the desired operating speed in about 5 seconds. Unfortunately, the speed suffers from a very large overshoot and continues to oscillate in speed with very large amplitude of 6 krpm. Such poor speed control in most motor applications is unacceptable.

Figure 4:
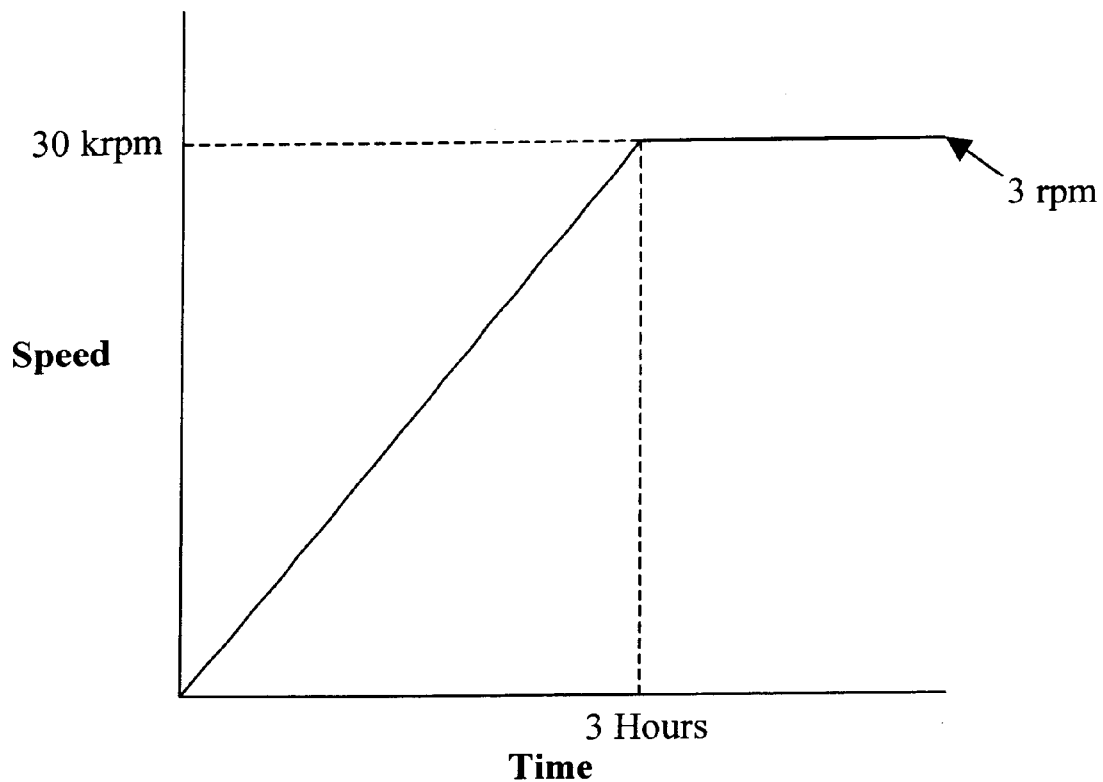
FIG. 4 is a graph showing speed vs. time in a speed control in accordance with the invention used in a flywheel system with low power-to-energy storage capacity.

The speed control is however well suited for flywheel energy storage systems. The speed control in accordance with the invention used in a flywheel system with a low power-to-energy storage capacity in FIG. 4. The performance is illustrated using the same control and operating speed but with a 300 pound flywheel with 15 inch diameter. The maximum acceleration torque of the motor is set at 6.4 pound-inches. The flywheel accelerates at full torque to the desired operating speed in approximately 3 hours. Once the flywheel reaches the desired operating speed, the acceleration torque is turned off. As the speed slows, the acceleration torque is turned full on and so forth. Using a very slow switching rate for the rate controller of 1 Hz, the flywheel speed oscillates with amplitude of less than 3 rpms. This amplitude is less than 0.01% and produces an oscillation in the flywheel stress level of less than 0.02%. Reliable and sufficiently accurate speed control is achieved.

Figure 5:
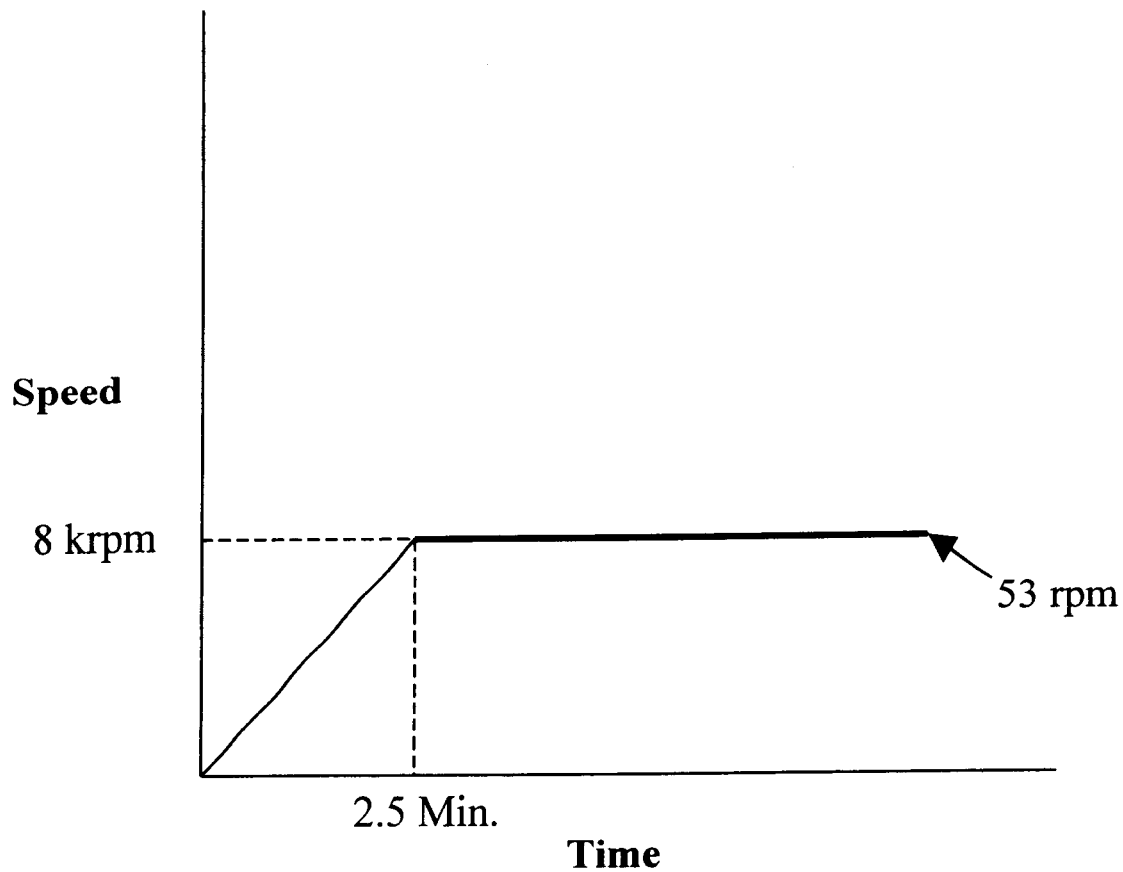
FIG. 5 is a graph showing speed vs. time in a speed control in accordance with the invention used in a flywheel system with high power-to-energy storage capacity.

Flywheel systems are also employed in high power applications where they supply power for only short periods of time such as bridging an interruption of power until an auxiliary power source is connected. Speed control in accordance with the invention used in a flywheel system with high power-to-energy storage capacity is shown in FIG. 5. The performance is illustrated using the same control and previous flywheel. This time the maximum acceleration torque of the motor is set at 640 pound-inches. The flywheel accelerates at full torque to a desired operating speed of 8 krpm in approximately only 2.5 minutes. The acceleration torque is turned off and on to maintain the steady state operating speed. Because of the increased torque to inertia, the oscillation amplitude is increased to 53 rpms. The amplitude is still less than 0.7% and because the stress in the flywheel is proportional to the square of the speed, the oscillation in the flywheel stress is less than 1.4%. Even in high power to storage capacity flywheel systems, steady state speed control oscillations would not fatigue the flywheel and these oscillations would also be much smaller by use of a faster switching frequency. The digital control again makes the speed control much more robust than previous methods.

Figure 6:
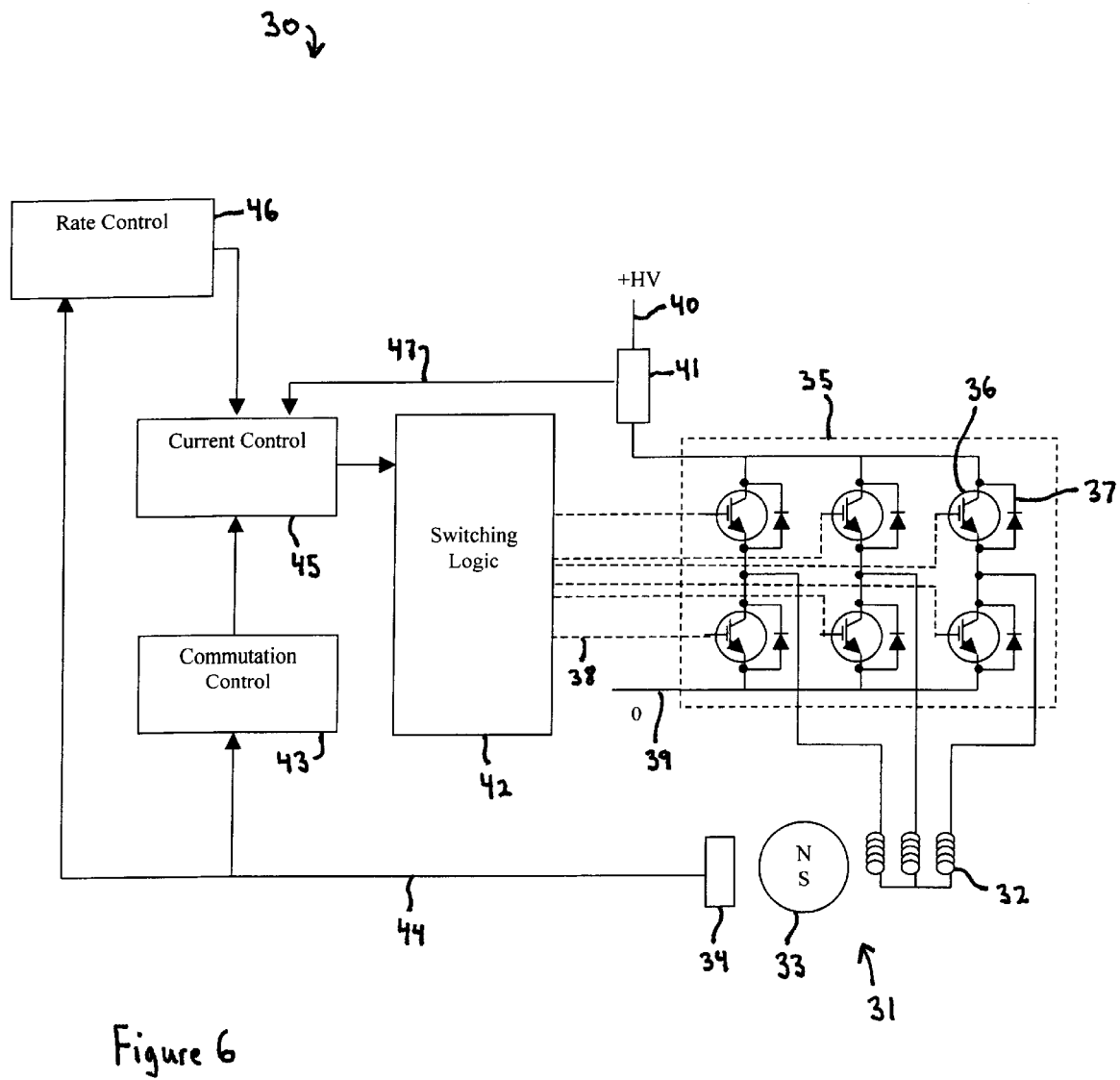
FIG. 6 is a schematic diagram of a flywheel speed control circuit in accordance with the invention.

A flywheel speed control circuit in accordance with the invention is shown in FIG. 6. The speed control circuit 30 is comprised of a brushless permanent magnet motor generator 31 for accelerating the flywheel 33. The motor/generator 31 has multiple armature coils 32 and three phase constructions are typical but not required. Position sensors 34 determine the rotational position of the flywheel 33 for synchronous excitation of the armature coils 32. Hall effect or optical type sensors are typically used. A synchronous inverter 35 that is comprised of multiple transistors 36 in a bridge arrangement drives the armature coils 32. As illustrated, a conventional H-bridge arrangement of the transistors 36 is shown for full wave driving of the armature coils 32. Half wave drives can alternatively be used where power is applied to the armature coils 32 with only one polarity. Likewise, the transistors 36 can be any type of numerous electronic switches well known in the art. Fast recovery diodes 37 are provided to prevent damage to the transistors 36 when switched off and to conduct current when the motor/generator 31 is functioning as a generator. The transistors 36 are triggered by gate signals 38 provided by switching logic 42 to provide the correct power to accelerate the motor 31.

The inverter 35 is powered from a DC buss 40 at high voltage relative to a ground 39. A current sensing element 41 for measuring the acceleration current is placed between the high voltage buss 40 and the inverter. The current sensor 41 could alternatively be located elsewhere in the circuit, such as in series with the armature coils 32. The switching logic 42, which provides the gate signals 38 to the transistors 36, is controlled by commutation control 43 using position feedback 44 from the position sensors 34 and also by current control 45 using feedback from the current sensor 41. The current control 45 prevents damage to the inverter 35 and the armature coils 32 of the motor/generator 31. The current control 45 uses pulse width modulation where the duty cycle of power from the high voltage buss 40 connected through the inverter to the armature coils 32 is controlled using high frequency switching, typically around 20 kHz. Pulse width modulation is most commonly employed. As the speed of the flywheel 33 increases, the back EMF induced in the armature coils 32 increases and hence the current to the coils would decrease. To compensate, the current control 45 increases the duty cycle to maintain full acceleration current as the speed increases. The commutation control 43 provides signals to the switching logic 42 to cause the power to the armature coils to be switched on and with the appropriate polarity at the appropriate time for acceleration. The combination of the inverter 35, switching logic 42, commutation control 43 and current control 45 from pulse modulation is usually called a servo amplifier. Such types of servo amplifiers are manufactured by numerous companies including Advanced Motion Controls, and they include both sinusoidal and trapezoidal motor excitation types.

To control the speed of the flywheel 33, a rate controller 46 also receives position feedback 44. Feedback 44 from a single position sensor 34 is all that is required due to the high rotational speed. The rate control 46 digitally turns the acceleration current on and off depending on whether the speed of the flywheel 33 is below or above the desired steady state speed, or below or above a band of speeds. That is, the current would be switched on at some speed below the desired steady state speed, and then switched off at the desired steady state speed to reducing the cycling of the motor and the motor controls. The on/off control can be applied to the reference inputs of servo amplifier. When the speed of the flywheel 33 exceeds the operating speed, the acceleration current could alternatively be switched to a level insufficient to maintain the speed instead of completely off. However, completely switching off is the most reliable way to prevent over-speed of the flywheel. The rate controller 46 measures the frequency of the excitation of the position sensor 34 and controls the acceleration to maintain the desired speed. Such types of rate controllers are manufactured by numerous companies with one preferred type being a Durant Ambassador series rate indicator. These controllers provide control as well as have a programmable rate display and an adjustable averaging time as low as 0.1 Hz.

Figure 7:
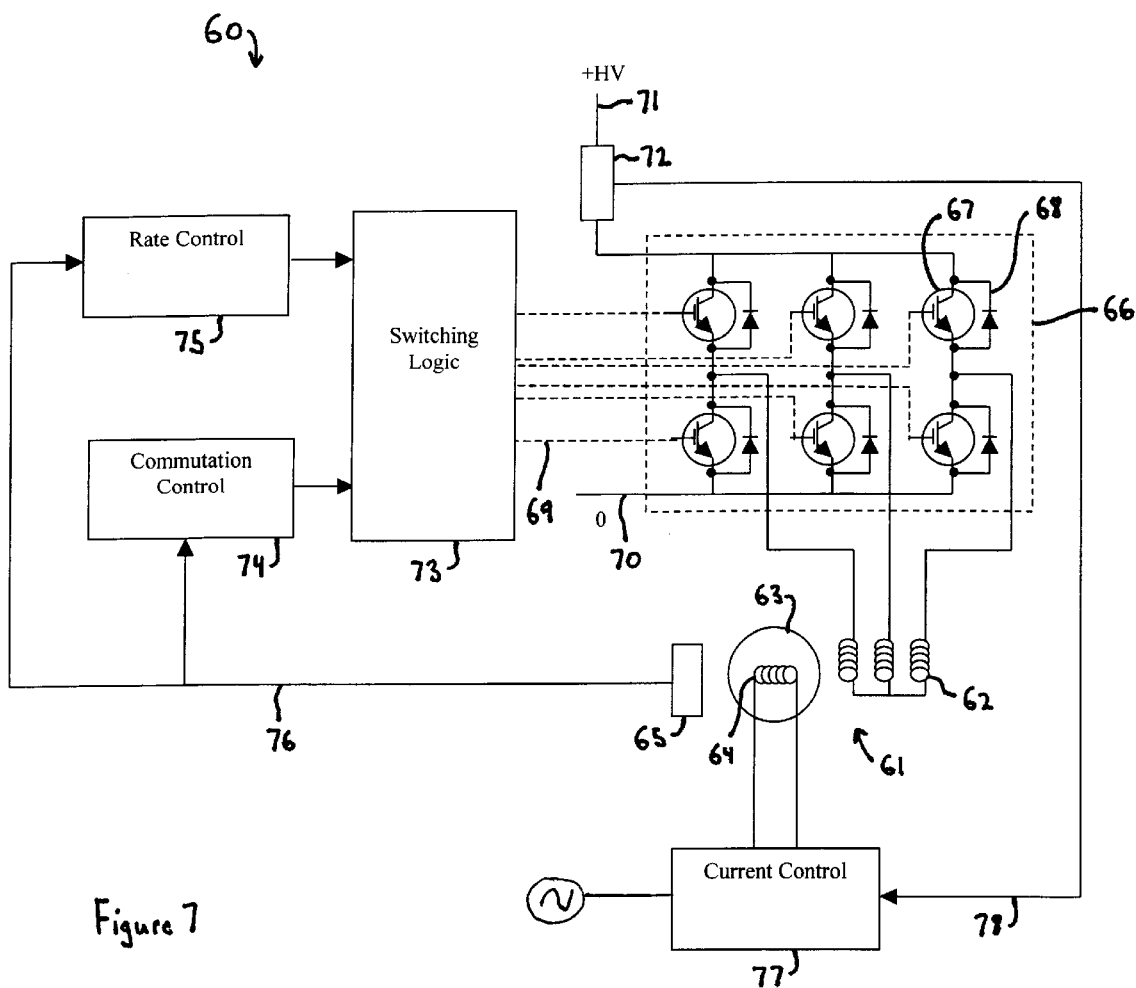
FIG. 7 is a schematic diagram of an alternate configuration flywheel speed control circuit in accordance with the invention.

The speed control method can be applied to flywheel systems that use permanent magnet motors, as shown in FIG. 6, and also to motors whose rotors are magnetically energized by use of a field coil. These motors include reluctance types and inductor alternators. An alternate configuration flywheel speed control circuit in accordance with the invention is shown in FIG. 7. The speed control circuit 60 is comprised of a brushless inductor alternator motor 61 that accelerates and decelerates a flywheel 63. The inductor alternator 61 has multiple armature coils 62 that are driven with synchronous AC during acceleration. The inductor alternator 61 also has a field coil 64 that magnetizes the rotor of the inductor alternator such that AC voltage is induced in the armature coils 62 as the flywheel 63 rotates. The level of current applied to the field coil 64 controls the level of voltage induced in the armature coils 62 at a given rotational speed. The flywheel 63 can serve as the rotor for the inductor alternator 61 if a high power capacity is required.

Position sensors 65 determine the rotational position of the flywheel 63 for proper synchronization of power applied to the armature coils 62. It is also known in the art to achieve synchronization without the use of position sensors 65 in a so-called sensorless drive. The position is determined directly from the armature coils 62 themselves in these cases. The armature coils are driven by an inverter 66, which has a bridge of individual transistors 67 and antiparallel diodes 68. The transistors 67 are activated by gate or base signals 69 supplied by a switching logic 73 for correct sequencing. The inverter 66 is powered by a high voltage DC buss 71 and a ground 70. A current sensor 72 measures the current supplied to the motor 61. The switching logic 73 is controlled by commutation control 74 that uses feedback 76 from the rotary position sensors 65.

Because the magnetization of the rotor portion of the motor can be controlled by varying current to the field coil 64, the current to the motor 61 can be controlled by two different methods. The current can be controlled the same as the previous configuration using pulse width modulation to the inverter in a servo amplifier arrangement. Alternatively, as shown in FIG. 7, the acceleration current can be controlled by adjusting the current applied to the field coil 64. A current control circuit 77 receives feedback 78 from the current sensor 72 and varies the current to the field coil 64. Increasing the current to the field coil increases the voltage induced in the armature coils 62 and thus reduces the acceleration current through the inverter 66. When pulse width modulation is not required, as in this configuration, the inverter 66 may be simply classified as an inverter and not a servo amplifier. The speed of the flywheel 63 is controlled using a rate controller 75 that determines the rotational speed from feedback 76 from a position sensor 65. If a servo amplifier is used, the rate controller 75 can switch the duty cycle from 0% to 100% to turn the acceleration current on and off to control the speed. Alternatively when a simple inverter is employed, the rate control 75 can disconnect the gate or base signals 69 from the transistors 67 to turn the acceleration off. The rate control 75 could also disable the position sensors to accomplish the same result.

Figure 8:
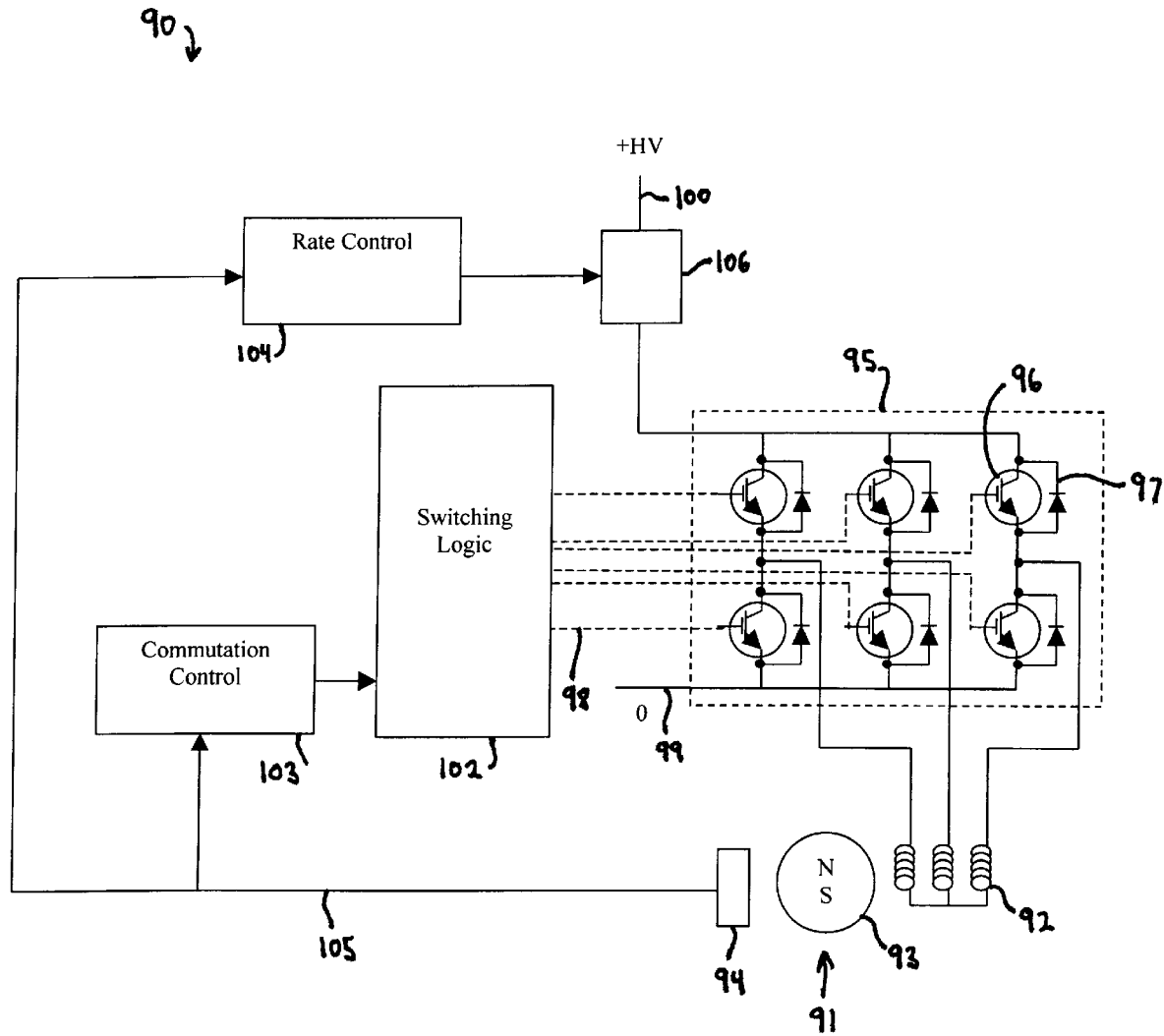
FIG. 8 is a schematic diagram of a second alternate configuration flywheel speed control circuit in accordance with the invention.

The speed control method can also work by switching power on and off prior to the inverter or motor drive electronics, as shown in FIG. 8 in a second alternate configuration flywheel speed control circuit 90 in accordance with the invention, controlling a brushless synchronous permanent magnet motor/generator 91 attached to a flywheel 93. The motor/generator 91 has three phase armature coils 92 that produce torque when energized. Position sensors 94 provide rotational position feedback 105 such that the power to the armature coils 92 is synchronized. The armature coils 92 are driven by an inverter 95 having an H-bridge of electronic switches 96 and antiparallel diodes 97 that conduct stored energy from the inductance of the armature coils 92. The electronic switches 96 are driven by gate signals 98 provided by switching logic 102. The inverter 95 is powered by a high voltage DC buss 100 and a ground 99. Commutation control 103 receives feedback 105 from the position sensors 94 and it activates the switching logic 102 to supply the correct gate pulses 98.

This configuration illustrates both current control and rate control being applied to power prior to the inverter 95. The acceleration current is controlled by varying the level of the DC buss 100 through one of multiple types of control means, not shown. The speed of the flywheel 93 is controlled by a rate controller 104 that uses feedback 105 from a position sensor 94. The rate controller 104 switches the power from the DC buss 100 on and off to control the speed using a relay or electronic switch 106. When the rate controller measures the frequency of the flywheel rotation to be above the desired steady state speed, the switch 106 is turned off. When the speed falls to below the desired lower operating speed, the switch 106 is turned back on. Appropriate diodes or protection, not shown, may be added to prevent damage to the switch 106 if the armature coils 92 have large inductance and are energized with high currents. Switching would typically occur from the rate controller at a frequency of less than 500 Hz and more likely less than 10 Hz.

Figure 9:
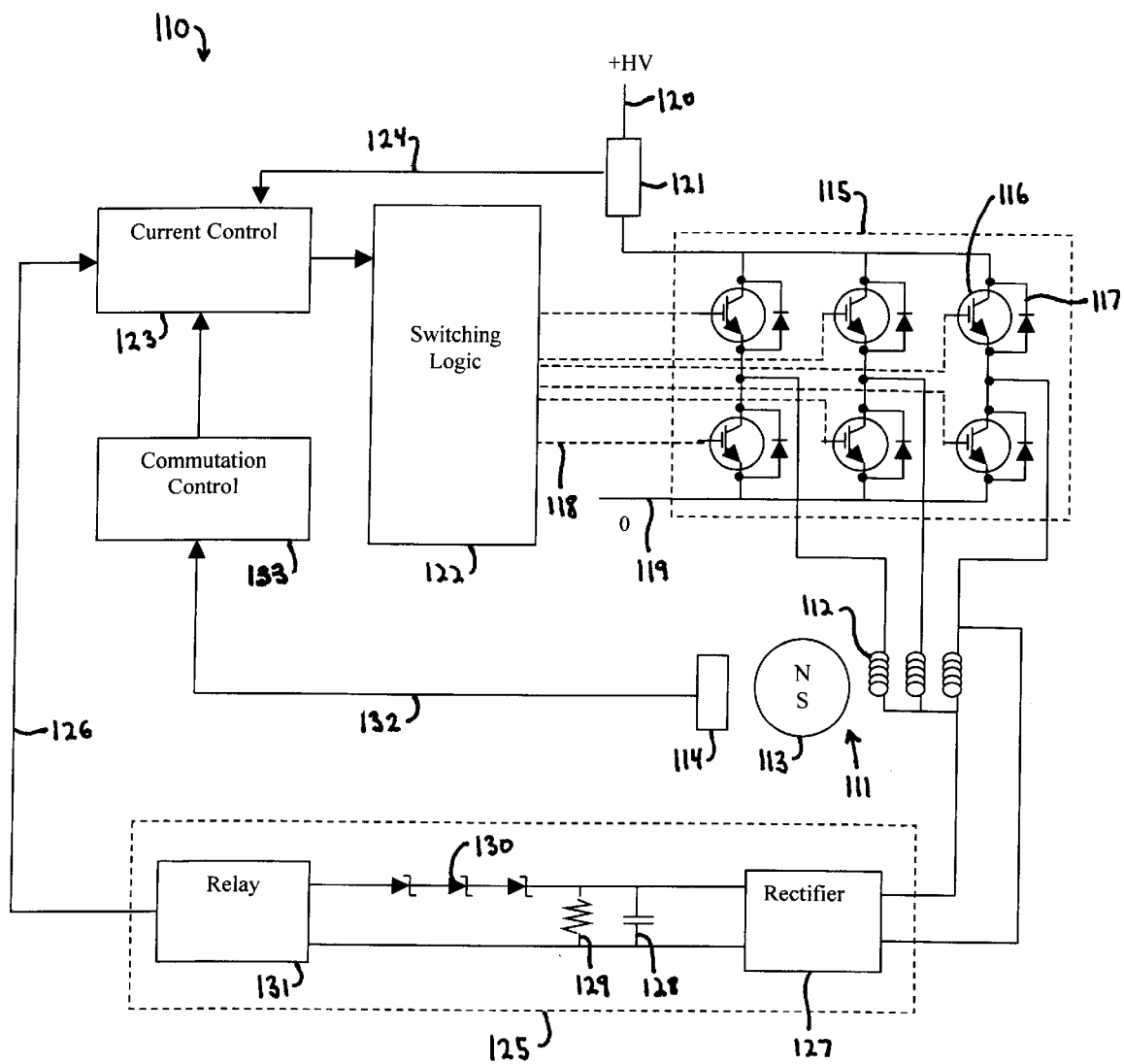
FIG. 9 is a schematic diagram of a third alternate configuration flywheel speed control circuit in accordance with the invention.

The speed control method can also work without using a frequency measuring controller or feedback from rotational position sensors, as illustrated in FIG. 9, wherein a third alternate configuration flywheel speed control circuit 110 in accordance with the invention is shown controlling a brushless permanent magnet motor/generator 111 integral with an energy storage flywheel 113. The flywheel 113 is accelerated and decelerated using multiple armature coils 112 and rotational position sensors 114 provide feedback 132 for synchronization of applied currents. The armature coils 112 are driven by an inverter 115 comprised of multiple transistors 116 and fast recovery diodes 117. The transistors 116 are appropriately activated by gate pulses 118 supplied by switching logic 122. The inverter 115 is powered from a high voltage DC buss 120 and a ground 119. A current sensor 121 measures the current to and from the motor/generator 111. The switching logic 122 is controlled by commutation control 133 using position feedback 132 from the position sensors 114 and by current control 123 using current feedback 124 from the current sensor 121. The current control 123 adjusts the duty cycle of pulse width modulation to the gate signals 118 while the commutation control 133 and switching logic 122 determine which gate signals 118 to activate for synchronization with the flywheel 113.

The speed of the flywheel is controlled using a rate controller 125 that does not count the pulses from the position sensors 114. The rate controller 125 measures the average voltage across one or more electromagnetic coils that are magnetically excited by the rotation of the flywheel and turns the acceleration on or off based on whether the average voltage exceeds a threshold value corresponding to the lower or upper desired steady state speed. In this case, the electromagnetic coil corresponds to an armature coil 112. However, a separate coil could also be used and a separate magnet with the advantage of possibly reducing any noise created from the switching of the inverter 115. The armature coil 112 is connected to a rectifier to convert the induced AC to DC. The output of the rectifier 127 is then filtered to provide smooth DC using a capacitor 128 and a resistor 129. Other filter methods known in the art could also be applied. Because the current to the motor is pulse width modulated, the peak voltage applied to the armature coils 112 would be roughly equal to the DC buss voltage 120 barring any capacitance in the circuits. The modulation however occurs at a frequency much higher than the rotational frequency. Therefore, the filter components 128, 129 are capable of filtering out the high frequency variations to provide an accurate measure of the average voltage across the armature coils 112. After filtering, the voltage from the rectifier is compared to a set threshold value corresponding to the desired flywheel speed. Temperature compensated zener diodes 130 are used to breakdown when the flywheel speed exceeds the desired steady state operating speed. Such diodes are readily available with high accuracy and can have temperature dependences 0.03% per degree C. In many flywheel system applications, the DC buss voltage 120 is also fairly high, further increasing the accuracy of the speed control. When the zener diodes 130 breakdown, a relay 131 is energized that sends a signal 126 to turn off the acceleration power. The relay 131 is preferably a solid-state type having a low and also reliable activation voltage and current. A transistor or other type of switch could also be used. The benefit of this type of rate control may include reduced costs but with possible reduced accuracy.

Figure 10:
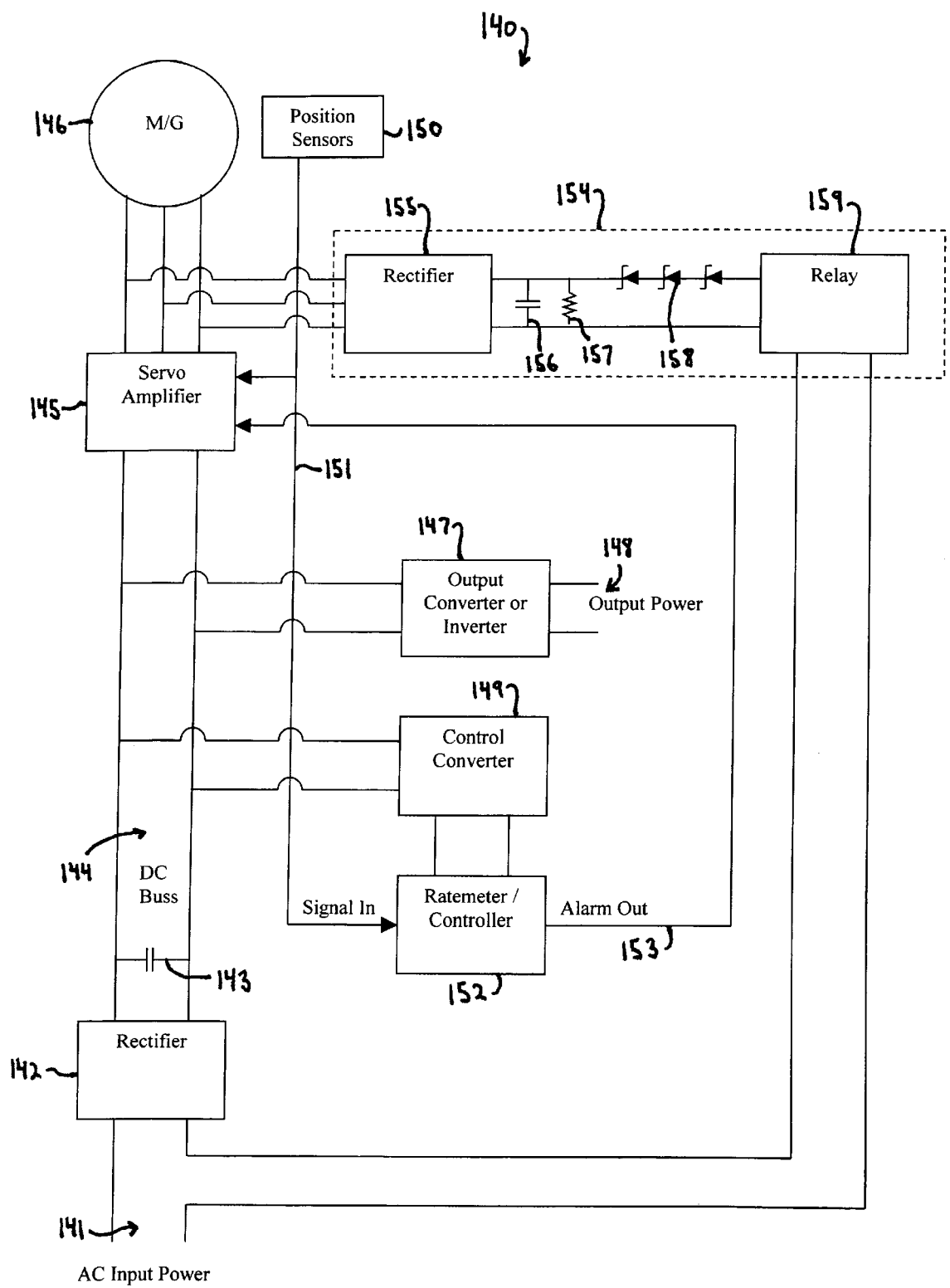
FIG. 10 is a schematic diagram of a flywheel energy storage system employing a speed control circuit in accordance with the invention.

Many possible configurations of power systems for flywheel energy storage can be a used depending on the goals and requirements of the application and the construction of the motor/generator. One example of a flywheel energy storage system employing a speed control circuit in accordance with the invention is shown in FIG. 10. The flywheel system 140 is connected to AC utility power 141 that provides energy for charging. The AC power is rectified using a rectifier 142 and smoothed with a capacitor 143 to provide relatively clean DC power to a DC buss 144. The DC buss 144 is connected to a servo amplifier 145 that drives a synchronous brushless permanent magnet motor/generator 146 that is attached to the flywheel, not shown. The DC buss 144 also supplies power to an output converter or inverter 147 that provides continuous output power 148. When the AC power 141 is interrupted, the generator 146 produces AC power from rotation driven by the flywheel. The voltage induced in the generator 146 is automatically conducted backwards through the servo amplifier and rectified through the internal antiparallel diodes, not shown in FIG. 10 but shown in FIGS. 6–9. A separate rectifier could be used instead if discharge current were significantly greater than the charging current.

The voltage at the DC bus 144 during discharging of the flywheel energy storage system falls as the speed of the generator 146 slows. The output converter or inverter 147 converts this falling DC voltage to a constant DC or AC output power 148 Other arrangements for producing constant output power can be used instead, as are known in the art. Instead of using an output converter or inverter 147, the servo amplifier 145 can be actively operated in fourth quadrant mode whereby it produces the desired regulated output power 148.

Regardless of the output power regulation method, the speed control is the same and applied to control the speed when input charging power 141 is on. A separate control converter 149 is powered by the DC buss 144 to produce a constant DC voltage to power a rate controller 152. The rate controller controls the flywheel speed by using feedback 151 from a motor position sensor 150. The position sensors 150 also provide feedback 151 to the servo amplifier 145 for commutation control. Current control is provided internal in the servo amplifier 145 in which a current sensor, not shown, provides feedback to control the duty cycle of the pulse width modulation. When the frequency of excitation of the motor sensor 150 exceeds the frequency corresponding to the desired steady state operating speed, the rate controller generates an alarm output 153 that turns off acceleration at the servo amplifier. The rate controller 153 is preferably solid state for reliability and long life. When the speed drops below the desired lower operating speed limit, the alarm output condition changes and the acceleration is turned back on. Some rate controllers can be set to include hysteresis. Hysteresis can reduce the rate of on/off switching but at the expense of a wide oscillation of flywheel speed.

A further aspect of the invention is also shown in FIG. 10, wherein a second speed control 154 in accordance with the invention is incorporated for safety over-speed protection. The safety over-speed protection circuit 154 rectifies AC power from the motor/generator 146 using a rectifier 155. The rectified power is smoothed using a capacitor 156 and resistor 157. In the event that the rate controller 152 or servo amplifier 145 malfunction, the safety over-speed protection 154 prevents over-speed of the flywheel. If the motor/generator 146 is accelerated sufficiently past the operating speed set by the rate controller 152, the zener diodes 158 breakdown, causing the solid state relay 159 to energize. The solid state relay 159 disconnects charging power 141. To disable the flywheel system 140 from an over-speed condition, the solid state relay 159 can be a latching type or and drive a mechanical latching relay, not shown, to disconnect the charging power 141. The relay 159 can alternatively disconnect the charging power at the DC buss 144.

Figure 11:
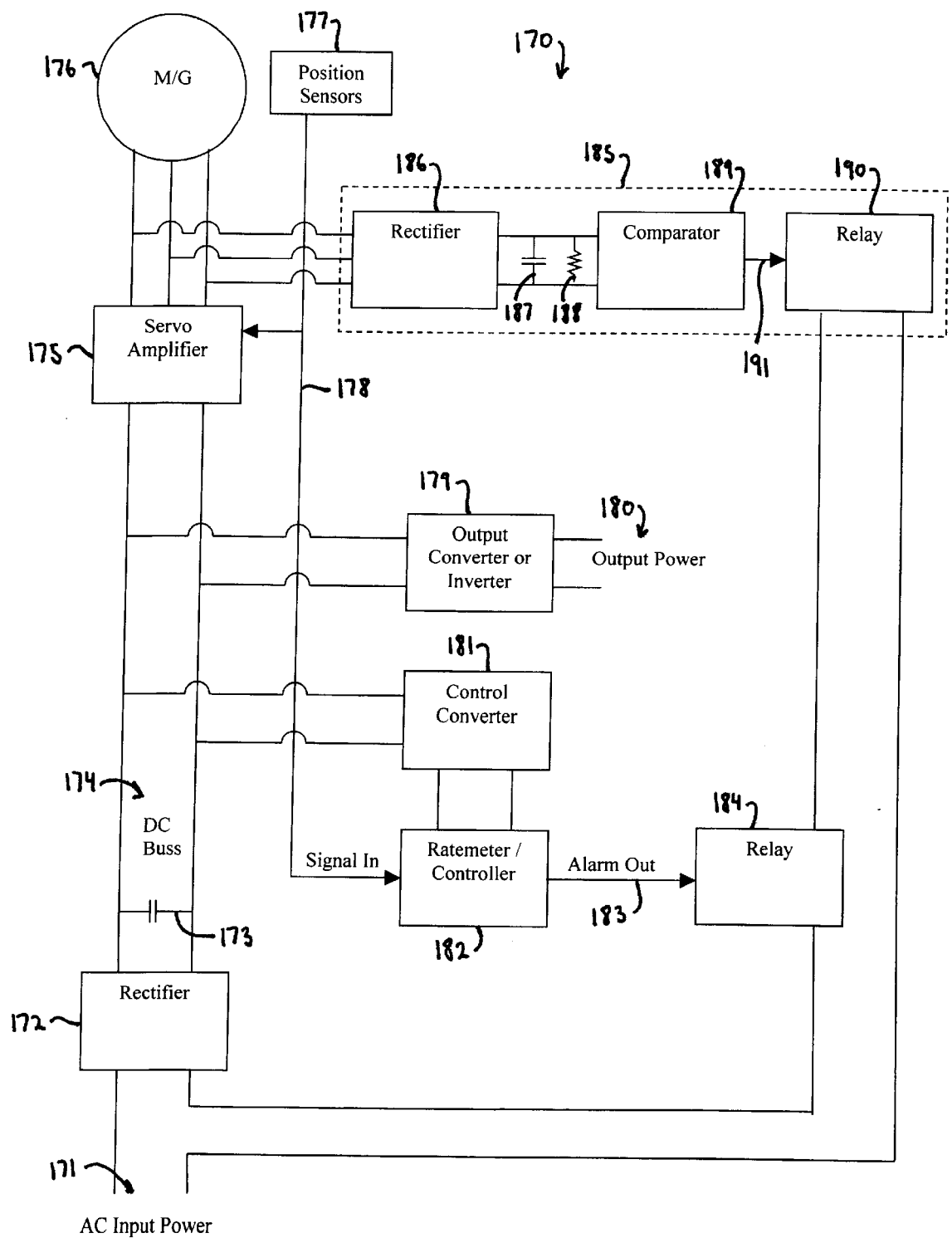
FIG. 11 is a schematic diagram of an alternate configuration flywheel energy storage system employing a speed control circuit in accordance with the invention.

An alternate configuration flywheel energy storage system employing a speed control circuit in accordance with the invention is shown in FIG. 11. The flywheel system 170 is charged from AC utility power 171. The input power 171 is rectified using a rectifier 172 and smoothed by a capacitor 173 to provide DC power to the DC buss 174. A servo amplifier 175 connected to the DC buss 174 drives the motor/generator 176. Also connected to the DC buss 174 is an output converter or inverter 179 that provides continuous output power 180. A separate control converter 181 provides DC power to a rate controller 182 that controls the flywheel speed. In some applications, it may be possible to power the rate controller 182 directly from the output power 180 or from the input power 171. The rate controller 182 controls the speed of the motor/generator 176 by using feedback 178 from a rotational position sensor 177. The rotational position sensors 177 also provide feedback 178 to the servo amplifier 175 for commutation control. Current control is provided internal in the servo amplifier 175 by varying the duty cycle of the pulse width modulation.

When the flywheel speed exceeds the desired operating speed, the rate controller triggers an alarm output signal 183 that energizes a solid state relay 184. The'solid state relay, disconnects the input charging power 171 to stop acceleration. Because some energy is stored in the capacitor 173, the acceleration is not stopped instantaneously but is sufficiently fast in most cases.

The flywheel system 170 also includes a safety over-speed protection 185 AC power from the motor/generator 176 is connected to a rectifier 186 that converts the power to DC which is filtered by a capacitor 187 and resistor 188 to provide an average voltage corresponding to the flywheel speed. The rectifier 186 is connected to a comparator 189 that provides a trigger output 191 to a separate relay 190 when the flywheel reaches an over-speed condition. The relay 190 is connected in series with relay 184 and causes the disconnection of input charging power 171 from over-speed. Because the over-speed circuit 185 operates preferably at very low current, inaccuracies from voltage drops are prevented. For increased accuracy, the rectifier 186 can be connected to separate coils from the motor/generator 176. This would eliminate any variations in voltage drops in the armature coils from load variations with the output power 180. Numerous other configurations of flywheel power systems can be constructed with use of the speed control method of the invention. Likewise, systems can be constructed with separate motors and generators where the speed control is applied to the motor.

Obviously, numerous modifications and variations of the described preferred embodiment are possible and will occur to those skilled in the art in light of this disclosure of the invention. For example, in all embodiments disclosed above, the brushless motor is a synchronous type. Induction motors are considered to be nonsynchronous types because the speed can vary from the frequency applied to the armature coils, and there is slip such that the motor rotates slower than the drive frequency. Induction motors are usually less efficient over the whole speed range, however, it would be possible to use the speed control method with an induction motor because the on/off control would accurately control its speed better than current methods of merely controlling the driving frequency. Using an induction motor would be less expensive, but would still require motor drive electronics in order to recover power from the flywheel.

In some modifications and variations of the invention, not all of the many functions and advantages described for the preferred embodiments would be needed. Therefore, I contemplate the use of the invention using fewer than the complete set of noted functions and advantages. Moreover, several species and embodiments of the invention are disclosed herein, but not all are specifically claimed, although all are covered by generic claims. Nevertheless, it is my intention that each and every one of these species and embodiments, and the equivalents thereof, be encompassed and protected within the scope of the following claims, and no dedication to the public is intended by virtue of the lack of claims specific to any individual species. Accordingly, it is expressly intended that all these embodiments, species, modifications and variations, and the equivalents thereof, are to be considered within the spirit and scope of the invention as defined in the following claims, wherein I claim:

What is claimed is:

1. A speed control method for a flywheel energy storage system comprising:
    a flywheel for rotation about an axis, and supported by a bearing system inside an enclosed container that is maintained with an internal vacuum for reducing aerodynamic drag;
    a brushless motor and generator for accelerating and decelerating said flywheel for storing and retrieving energy;
    a current limiter that limits the acceleration current to said motor for accelerating said flywheel;
    a rate controller for digitally switching the acceleration current on and off to maintain the steady state speed within desired limits;
    whereby, said rate controller turns said acceleration current off when the flywheel speed is above the desired steady state speed upper limit, and then turns the acceleration current back on when the flywheel speed fails below the desired steady state speed lower limit.

2. A speed control method as described in claim 1 wherein:
    said rate controller measures the frequency of excitation of a rotational position sensor and turns the acceleration on or off based on whether the frequency of excitation exceeds a threshold value corresponding to the desired steady state speed.

3. A speed control method as described in claim 1 wherein:
    said rate controller measures the average voltage across one or more electromagnetic coils that are magnetically excited by the rotation of said flywheel and turns the acceleration on or off based on whether the average voltage exceeds a threshold value corresponding to the desired steady state speed.

4. A speed control method as described in claim 3 wherein:
    the electromagnetic coils are phases of the armature coils of the motor and generator.

5. A speed control method as described in claim 1 wherein:
    said rate controller switches the acceleration current on and off by switching between a high and low reference input to a servo amplifier that drives said motor.

6. A speed control method as described in claim 1 wherein:
    said rate controller switches the acceleration current on and off by switching AC power on and off prior to rectification to a DC buss and supply to an inverter for driving said motor.

7. A speed control method as described in claim 1 wherein:
    said rate controller turns the acceleration current on and off by switching power on and off prior to a motor drive.

8. A speed control method for a flywheel energy storage system having a flywheel for rotation about an axis, and supported by a bearing system inside an evacuated chamber within a container; and a brushless motor and generator for accelerating and decelerating said flywheel for storing and retrieving energy, said method comprising:
    limiting acceleration current to said motor to stop accelerating said flywheel when an upper speed limit of said flywheel is reached;
    switching said acceleration current with a rate controller between a high and low level to maintain said desired steady state speed between a lower limit and an upper limit;
    whereby said rate controller maintains said desired steady state speed within said limits by switching said acceleration current low when said flywheel speed is above said desired steady state speed upper limit, and then switching said acceleration current back high when the flywheel speed falls below said lower limit of said desired steady state speed.

9. A speed control method as described in claim 8 wherein:
    said rate controller switches between high and low at a maximum frequency that is less than 500 Hz.

10. A speed control method as described in claim 9 wherein:
    said motor comprises a permanent magnet excitement.

11. A speed control method as described in claim 10 wherein:
    said current limiting that limits acceleration current comprises pulse modulation.

12. A speed control method as described in claim 9 wherein:
    said motor comprises a field coil to which a field current is, applied and varied for limiting the acceleration current of said motor.

13. A seed control method for a flywheel energy storage system having a flywheel for rotation about an axis, and supported for rotation by a bearing system inside an evacuated chamber within a container; and a brushless permanent magnet excited motor and generator for accelerating an decelerating said flywheel for storing and retrieving energy, said method comprising:
    detecting when said flywheel rotation exceeds a predetermined upper speed limit, by sensing when average voltage across one or more phases of armature coils of the motor/generator exceeds a threshold value
    limiting acceleration current to said motor to prevent acceleration of said flywheel when said flywheel speed exceeds said predetermined upper limit.

14. A speed control method as described in claim 13 wherein:
    said limiting of said accelerating current includes disconnected charging power to said motor when said average voltage exceeds a threshold value.

* * * * *